United States Patent
Yamashita

(10) Patent No.: US 12,509,294 B2
(45) Date of Patent: Dec. 30, 2025

(54) METHOD FOR OPERATING A STORAGE FACILITY WITHOUT LIFTS

(71) Applicant: Dematic GmbH, Heusenstamm (DE)

(72) Inventor: Shin Yamashita, Oberursel (DE)

(73) Assignee: Dematic GmbH, Heusenstamm (DE)

(*) Notice: Subject to any disclaimer, the term of this patent is extended or adjusted under 35 U.S.C. 154(b) by 350 days.

(21) Appl. No.: 18/299,369

(22) Filed: Apr. 12, 2023

(65) Prior Publication Data

US 2023/0331475 A1  Oct. 19, 2023

(30) Foreign Application Priority Data

Apr. 13, 2022  (EP) ..................................... 22168210

(51) Int. Cl.
*B65G 1/04* (2006.01)
*B65G 61/00* (2006.01)
*B65G 1/137* (2006.01)

(52) U.S. Cl.
CPC .......... *B65G 1/0414* (2013.01); *B65G 1/0428* (2013.01); *B65G 61/00* (2013.01); *B65G 1/1373* (2013.01); *B65G 2201/0235* (2013.01)

(58) Field of Classification Search
CPC ............................ B65G 1/0414; B65G 1/0428
See application file for complete search history.

(56) References Cited

U.S. PATENT DOCUMENTS

| | | | |
|---|---|---|---|
| 5,102,283 A | 4/1992 | Balzola Elorza | |
| 9,187,245 B2 * | 11/2015 | Razumov | ............ B65G 1/1373 |
| 9,452,886 B2 | 9/2016 | Yamashita | |

(Continued)

FOREIGN PATENT DOCUMENTS

| | | |
|---|---|---|
| DE | 202004012021 U1 | 12/2005 |
| DE | 102012112828 A1 | 6/2014 |
| EP | 1964792 B1 | 4/2012 |

OTHER PUBLICATIONS

International Search Report from corresponding European Patent Office Application No. EP 22168210.7, completed Sep. 2, 2022.

(Continued)

*Primary Examiner* — Jonathan Snelting

(74) *Attorney, Agent, or Firm* — Gardner, Linn, Burkhart & Ondersma LLP

(57) ABSTRACT

A storage facility having storage racks and aisles, with storage and removal apparatuses for each aisle. Transportation units are placed into and removed from racks via the storage/removal apparatus and a direct horizontal exchange of units takes place between adjacent aisles via exchange locations within the racks, where the storage/removal apparatus itself actively horizontally moves the units in the exchange locations. Each storage/removal apparatus has a vertical operating range for servicing more than one rack level and each aisle has enough storage/removal apparatuses to access all rack levels of an aisle. The vertical operating/service level of each storage and removal apparatus of an aisle is offset/staggered relative to the vertical operating/service level of each storage and removal apparatus of a neighboring/adjacent aisle such that units can be routed through the storage facility without lifts by being actively exchanged between aisles and rack levels by the storage and removal apparatuses.

6 Claims, 2 Drawing Sheets

(56) References Cited

U.S. PATENT DOCUMENTS

2009/0162173 A1\* 6/2009 Garbers ............... B65G 1/0407
　　　　　　　　　　　　　　　　　　　　　　414/331.14
2015/0197397 A1　　7/2015 Razumov
2018/0086558 A1\* 3/2018 Bergendorff .............. B60L 5/38
2019/0308812 A1\* 10/2019 Lindblom ............ B65G 1/1375

OTHER PUBLICATIONS

Examination Report from corresponding European application No. 22168210.7 dated Jul. 28, 2025.

\* cited by examiner

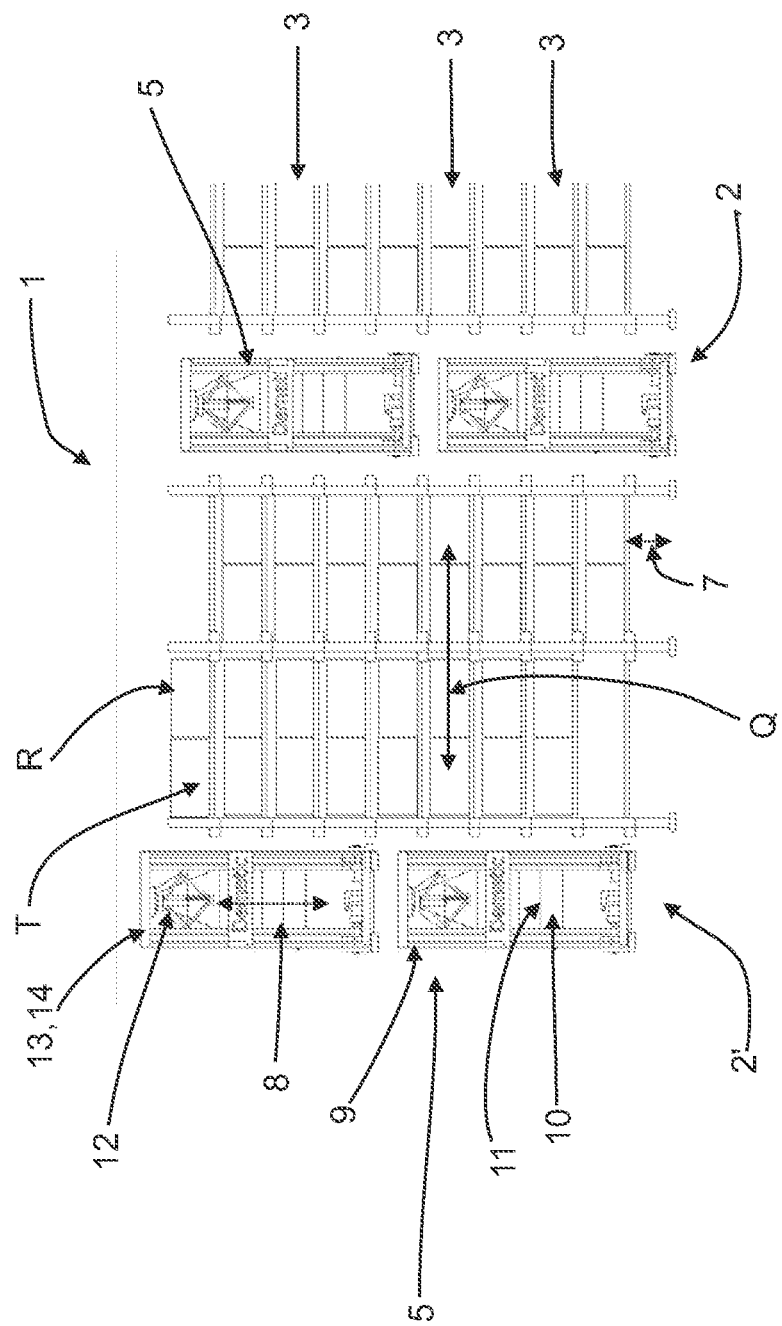

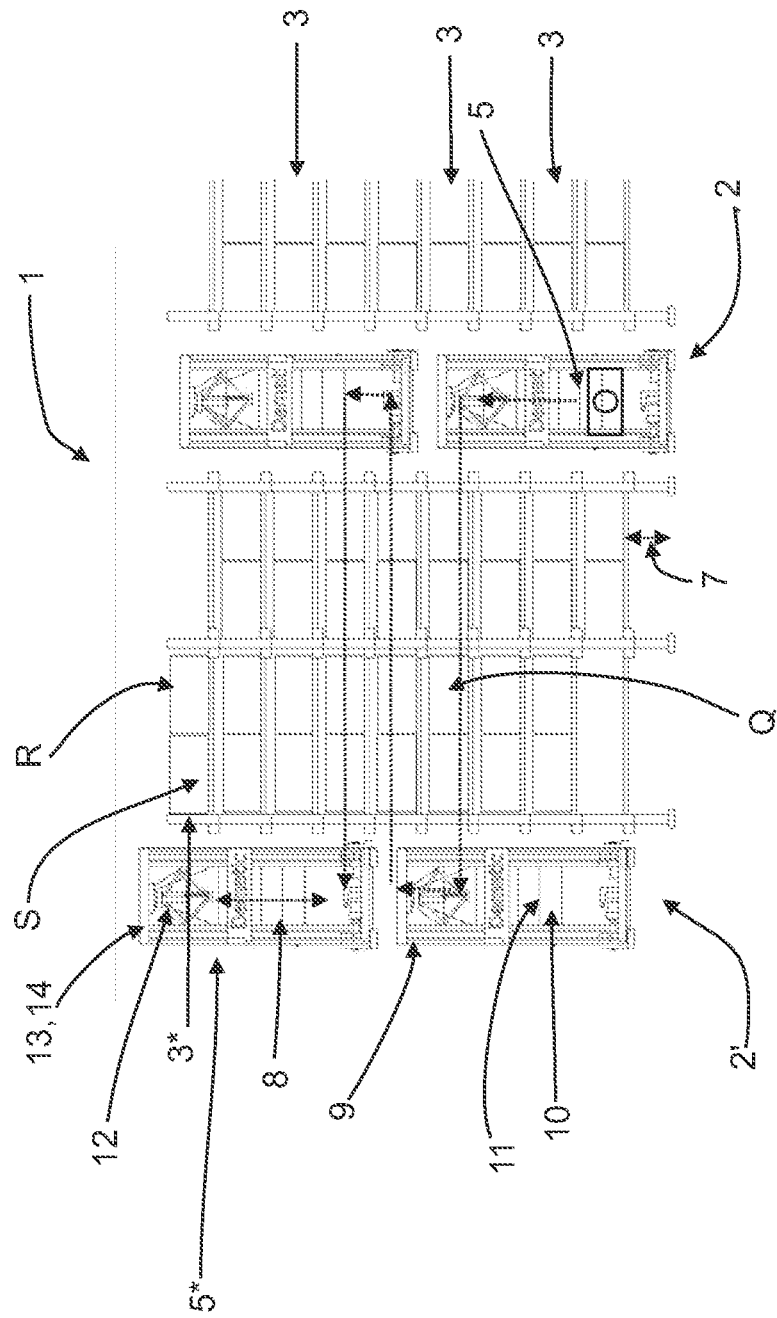

METHOD FOR OPERATING A STORAGE FACILITY WITHOUT LIFTS

CROSS REFERENCE TO RELATED APPLICATION

The present application claims priority to EP Application Serial No. 22168210.7, filed on Apr. 13, 2022, which is herein incorporated by reference in its entirety.

BACKGROUND AND FIELD OF INVENTION

The invention relates to a method of operating a storage.

When picking or compiling orders from ready-picked transport units, such as e. g. articles or containers, it is necessary to provide the transport units, which are associated with a common order, in a targeted or sorted manner. For this purpose, it is typical to temporarily store (buffer) the transport units of one order until all of the transport units required for the order are present. They are then passed collectively onto a collecting line which guides them e. g. to the palletization area, picking station, goods issuing department, dispatch etc.

A (high) rack storage facility includes a feeding or storage-entry area, via which the goods are delivered and from which the racking serving units collect the goods for entry into storage, the so-called pre-zone. Similarly, a removal-from-storage area is required, at which after removal from storage the racking serving units place down the goods also assigned to the pre-zone. In the case of automatic picking warehouses, picking points are typically arranged in the pre-zone. The pre-zone is also where the goods are identified for the inventory management system or the material flow computer.

The applicant's EP 1 964 792 B1 discloses a method for providing transport units from a storage facility in a desired sequence on at least one collecting line. Racking serving units in each storage racking aisle, removal-from-storage lifts and removal-from-storage feeding lines are controlled so as to be coordinated with one another and are loaded with goods such that they ultimately end up sorted on the collecting line or are delivered thereby.

The control and coordination are therefore relatively complex and obviously require technical installations in the so-called pre-zone, i.e. the area outside the actual racking.

U.S. Pat. No. 9,452,886 B2 discloses exchange of transporting units directly between adjoining storage racks from one access aisle to a specific aisle via transverse conveyance locations in the storage racks themselves, wherein the storage and removal vehicle comprises a shuttle at each level of the storage racks, wherein the directly exchanging comprises the shuttle acting on the transport units to displace the transport units by contact with the shuttle in the transverse conveyance locations from one of the adjoining racks to the other of the adjoining racks including transferring product transport units to the specific aisle using the transverse locations.

However, lifts are in contrast to shuttles the bottleneck in such systems.

DE 20 2004 012 021 U1 discloses a storage system that has at least one conveyor with a horizontal transporting unit and executing vertical or vertical and horizontal movements between two shelf columns installed one behind the other. The storage system has at least one row of more than two shelf columns placed one behind the other and separated from one another by respective feed shaft equipped with a conveyor. Though each of the conveyors are movable on both sides of each shelf column, all the compartments of these shelf columns can be directly loaded or emptied.

SUMMARY OF THE INVENTION

The present invention provides a method of operating a storage facility in a fashion that alleviates the bottleneck created by lifts and at the same time allows for a reduced technical outlay whilst dispensing with sorting outside of the storage racks.

In accordance with one embodiment of the invention, it has been recognized that if each storage and removal apparatus has a vertical operating range adapted to service more than one storage rack level in its respective aisle and that each aisle has enough of said storage and removal apparatus to access all storage rack levels of an aisle; the vertical operating/service level of each storage and removal apparatus of a first aisle is offset/staggered in relation to the vertical operating/service level of each storage and removal apparatus of a neighboring/adjacent second aisle, such that storage units can be vertically and horizontally routed through the storage facility by being actively exchanged between aisles and storage rack levels by use of the storage and removal apparatus only, it is possible to optimize operation of the storage by reducing use of the lifts which leads to high performance due to the number of storage and removal apparatus and enhanced scalability as the number can be increased or reduce an investment of lifts for the same performance.

In other words, vertical transportation of storage units can be achieved by using storage and removal apparatus in neighboring aisles that have overlapping but staggered vertical operation levels in addition to the lifts. The storage units are handed from one storage and removal apparatus to the next storage and removal apparatus which then moves the storage unit internally to a different storage rack level and so on until the storage unit reaches its final aisle and level.

According to an embodiment of the invention, an exchange of a storage unit from a first storage rack level to a second storage rack level not being in the operating range of the same storage and removal apparatus takes place by a first horizontal exchange between aisles and then a vertical exchange between storage rack levels.

If the vertical operating range of storage and removal apparatus in a first aisle and of storage and removal apparatus in a second aisle (neighboring) overlap by at least one vertical storage rack level, the number of storage and removal apparatus needed may be optimized for vertical operation scope.

In another embodiment, the picking process can take place within the racking itself to save time, without need for the storage units to leave the storage rack, i.e. be discharged, sorted and routed to a picking station and back again. To do so, at least one storage and removal apparatus per aisle includes a picking device for picking from a storage unit into an order unit, which picking device comprises a gripper or gripping device, wherein the storage and removal apparatus comprises a receiving location for each of the storage unit and the order unit, which are both arranged on the receiving location to be reachable by the gripping device to perform the picking operation, and the gripping device is actuated by a platform-supported image acquisition and evaluation unit and by a platform-supported controller to execute the picking operation, and wherein the apparatus comprises a level change element allowing the receiving location to change the storage rack level being accessed. Optionally, all storage and removal apparatus include such picking device.

The invention allows for unrestricted access to all inventory by having 3D routing capability in a shuttle system by combining inter-aisle transfer (iAT) and inter-level transfer (iLT) to the shuttle system.

In addition, by equipping the shuttle with a picking mechanism (on the shuttle), it enables such mobile shuttle to fulfill orders within the storage in three dimensions without need for units leaving the storage. This reduces storage and retrieval processes, movement and traffic creating congestion by removing the material flow bottleneck as well as reduction of equipment like lifts, GTP stations and conveyors and eliminating labor (manual picking).

Due to reduced and/or distributed traffic, this allows a high scalability of the system in storage volume and throughput.

BRIEF DESCRIPTION OF THE DRAWINGS

Further features and details of the invention will be apparent from the description hereinafter of the drawing, in which FIG. 1 shows a schematic side view in longitudinal direction of an aisle of a storage rack according to a first embodiment of the invention; and FIG. 2 shows an exemplary routing of transportation units in the storage rack of FIG. 1.

DETAILED DESCRIPTION

FIG. 1 shows a storage facility 1, the storage facility 1 having a plurality of storage racks R and storage rack levels 3 for storage of transportation units T, wherein the storage racks R have an aisle 2 between them on one side and are placed back-to-back on the other side. The transportation units T may be trays, totes, containers etc. and be of the storage type S in which product is stored so to be picked from when fulfilling orders. The transportation units T may also be of the order type O into which product is put or placed according to an order for fulfilling said order at least partially.

In each aisle 2 more than one storage and removal apparatus 5 is provided, which handles transportation units T to be placed into the storage racks R and removed from the storage racks R via load handling means of the storage and removal apparatus 5.

As a direct exchange of transport units T takes place between two adjoining storage racks, from one storage racking aisle 2 to an adjacent storage racking aisle 2' via transverse conveyance locations Q in the storage racks R, it is possible to dispense with the distribution and/or complex sorting in the pre-zone, since the transport units are already sorted when removed from storage, even if initially they were not arranged in a common racking aisle, as they are stored in the meantime in the removal-from-storage aisle, even if initially they were stored somewhere else. Therefore, by dispensing with the distribution and sorting outside of the aisles it is possible to achieve a direct transfer of the transport units without conveyors crossing one another, and this can be achieved with reduced and simplified technical outlay as well as with a smaller space requirement and a high level of reliability.

The transport units can thus be simply removed from storage from the respective aisle in the required sequence. In accordance with the invention, the storage and removal apparatus 5 serves to move the transport units T in the transverse conveyance locations (Q), i.e., there is no further drive technology in the rack, but the storage-entry and removal-from-storage apparatus itself is the only active mechanism involved in the transverse displacement.

The storage and removal apparatus 5 places the transport units from the source aisle 2 directly into the transverse conveyance locations Q of the target aisle 2' (by means of multiple-depth storage entry), which means that storage and removal apparatus 5 of the adjacent target aisle 2' simply has access thereto. In other words, racking storage locations of abutting racks are used for passing transport units from one side of the rack to the next, so that the transport units can be transferred from one rack to the next.

The storage and removal apparatus 5 comprises a transport platform 10 for receiving the respective transport unit T (carton, tray, container, goods without loading aids, etc.). Arranged at the side of the transport platform 10 are in each case telescopic arms 11 which push the transport unit T off the platform 10 or pull it up onto the platform. For this purpose, the load picking-up means of the storage and removal apparatus 5, i.e. telescopic rail arms 11 with engaging fingers, have an extended reach and can be extended on both sides of the storage racking aisle 2 into the racks R in a known manner.

The storage racks R are provided on each level 3 with specific exchange locations Q for transversely conveying transport units T from one rack R to the adjacent rack R, so that the transport units T are exchanged within the storage racks R themselves and corresponding outlay in the pre-zone can be avoided.

A direct horizontal exchange of transportation units T takes place from one aisle 2 to an adjacent aisle 2' via exchange locations Q within the storage racks R, wherein the storage and removal apparatus 5 itself actively horizontally moves (pushes and/or pulls) the transportation units T in the exchange locations Q. In the present embodiment, all levels 3 may include exchange locations Q, even though only one is depicted in FIG. 1.

Additionally, in contrast to the prior art, each storage and removal apparatus 5 has a vertical operating range 6 adapted to service more than one storage rack level 3 in its respective aisle 2 and that each aisle 2 has enough of said storage and removal apparatus 5 to access all storage rack levels 3 of an aisle 2.

The storage and removal apparatus 5 running on rails created by the racks in a certain level 3 and vertical operating range 6 is achieved by the storage and removal apparatus 5 having internal lifting means 8 for changing the storage rack level 3 of a transportation unit T carried, so as to vertically expand the vertical operation range of the telescopic rail arms 11 within a vertically extended cage-like frame structure 9 of the storage and removal apparatus 5, in which the transport platform 10 is formed.

The vertical operating/service range of each storage and removal apparatus 5 of a first aisle 2 is offset/staggered (see arrow 7) in relation to the vertical operating/service level of each storage and removal apparatus 5 of a neighboring/adjacent second aisle 2', such that storage units T can be vertically and horizontally routed through the storage facility 1 without lifts by being actively exchanged between aisles 2 and storage rack levels 3 by use of the storage and removal apparatus 5 only, in which a change of serviced rack level 3 is achieved via the internal lifting means 8, which lift and lower the transport platform 10 (and incl. any transport unit T thereon) together with the telescopic rail arms 11 within the cage-like frame structure 9.

Each storage and removal apparatus includes a picking device 12 for picking from a storage unit S into an order unit O. To enable such, the transport platform 10 is broad enough to allow two transportation units T, namely the storage unit S and order unit O, to be on the transport platform 10 at the same time.

The picking device comprises a gripper or gripping device 12 which has an operation such that it can access any product in the storage unit S being on the transportation platform 10 and then place such into the order unit O also being on the transportation platform 10. The gripping device 12 is actuated by a platform-supported image acquisition and evaluation unit 13 and by a platform-supported controller 14 to execute the picking operation (integrated into the onboard controller). As explained below with reference to FIG. 2, it therefore becomes possible to perform 3D routing and then picking of orders into order units O from storage units S being located in different aisles.

The order unit O from aisle 2 needs to be transferred from storage and removal apparatus 5 to the neighboring aisle 2' and also from the lower rack level 3 to an upper rack level 3\*, so that automated picking can take place in storage and removal apparatus 5\* using storage unit S on level 3\* in aisle 2'. To do so, order unit O is first lifted within storage and removal apparatus 5 by lifting means 8, then horizontally transferred in an exchange location Q to aisle 2', where a second storage and removal apparatus 5 receives and pulls the order unit onto its platform 10. There the order unit O is again lifted internally and then horizontally transferred in an upper exchange location Q back to aisle 2 at a higher rack level 3 to a third storage and removal apparatus 5. Again, order unit O is lifted internally and then horizontally transferred in an upper exchange location Q back to aisle 2'. There it is received by storage and removal apparatus 5\* which has access to level 3\* and can now temporarily retrieve storage unit S and using gripper 12 to perform the required pick and place operation into order unit O. The routing of order unit O is indicated by hashed arrows in FIG. 2.

Changes and modifications in the specifically described embodiments can be carried out without departing from the principles of the present invention which is intended to be limited only by the scope of the appended claims, as interpreted according to the principles of patent law including the doctrine of equivalents. The priority German application no. EP 22168210.7, filed Apr. 13, 2022, is hereby incorporated by reference, in particular for support with regard to the translation for the present disclosure.

The invention claimed is:

1. A method of operating a storage facility, the storage facility having a plurality of storage racks, each storage rack having a plurality of storage rack levels for storage of transportation units, wherein the storage racks are adjacent a first aisle on one side thereof and a second, neighboring/adjacent aisle on its opposed side thereof, wherein for each aisle more than one storage and removal apparatus is provided, transportation units are placed into the storage racks and removed from the storage racks via the storage and removal apparatuses and a direct horizontal exchange of transportation units takes place from the first aisle to the neighboring/adjacent aisle via exchange locations within the storage racks, wherein each storage and removal apparatus itself actively horizontally moves the transportation units in the exchange locations, said method comprising:

arranging each storage and removal apparatus to have a vertical operating range from an uppermost level to a lowermost level and adapted to service more than one storage rack level in its respective aisle and that each aisle has enough of said storage and removal apparatuses to access all storage rack levels of an aisle; and vertically offsetting or staggering the vertical operating range of each storage and removal apparatus of the first aisle in relation to the vertical operating range of each corresponding storage and removal apparatus of the second neighboring/adjacent aisle wherein the uppermost level of each storage and removal apparatus of the first aisle is above the uppermost level of each corresponding storage and removal apparatus of the second, neighboring/adjacent aisle and the lowermost level of each storage and removal apparatus of the first aisle is above the lowermost level of each corresponding storage and removal apparatus of the second, neighboring/adjacent aisle, wherein the transportation units can be vertically and horizontally routed through the aisles via a storage and removal apparatus of the first aisle and horizontally routed through the storage rack levels to a corresponding storage and removal apparatus of the second, neighboring/adjacent aisle without lifts by being actively exchanged between aisles and storage rack levels by use of the storage and removal apparatuses only.

2. The method according to claim 1, wherein said overlapping or staggering the vertical operating range of the storage and removal apparatus in the first aisle and of the corresponding storage and removal apparatus in the second, neighboring/adjacent aisle includes vertically staggering the vertical operating range of the storage and removal apparatus in the first aisle by at least one vertical storage rack level relative to the operating range of the corresponding storage and removal apparatus in the neighboring/adjacent aisle wherein the uppermost level of the storage and removal apparatus the first aisle is offset by at least one vertical storage rack level from the uppermost level of the corresponding storage and removal apparatus in the neighboring/adjacent aisle.

3. The method according to claim 1, further comprising exchanging a storage unit from a first storage rack level to a second storage rack level not being in the operating range of the same storage and removal apparatus takes place by a first exchange between first aisle from one of the storage and removal apparatuses in the first aisle and then between the first storage rack level and the corresponding storage and removal apparatus in the second, neighboring/adjacent aisle, with the corresponding storage and removal apparatus in the second, neighboring/adjacent aisle removing the storage unit from the first storage rack level and then raising the storage unit to exchange the storage unit with the second storage rack level.

4. The method according to claim 1, wherein that at least one storage and removal apparatus per aisle includes a picking device, said method further comprising picking from a transportation unit functioning as a storage unit into a transportation unit functioning as an order unit, which picking device comprises a gripper, wherein the storage and removal apparatus comprises a receiving location for each of the storage unit and the order unit, arranging the storage unit and the order unit at each receiving location to be reachable by the gripper to perform the picking operation, and actuating the gripper by a platform-supported image acquisition and evaluation unit and by a platform-supported controller to execute the picking operation, and wherein the apparatus comprises a level change element allowing the receiving location to change the storage rack level being accessed.

5. The method according to claim 4, further comprising routing storage units and/or order units through the plurality of storage racks in all x-y-z directions based on either:
- a) only storage units are transferred to a specific aisle and/or storage level by means of the more than one storage and removal apparatus, wherein the aisle is selected based upon minimization of the movement of the more than one storage and removal apparatus between aisles and/or storage levels and order utilization and distribution of inventory in the storage racks for optimized consolidation in an aisle and/or storage level for order fulfilment;

or
- b) only order units are transferred by means of the more than one storage and removal apparatus from aisle to aisle and/or storage level to storage level until a respective order is fulfilled, based upon minimization of lift use and/or retrieval movements;

or
- c) order units as well as storage units are transferred by means of the more than one storage and removal apparatus for order fulfilment, based upon minimization of lift use and/or retrieval movements.

6. The method according to claim 1, further comprising providing each storage and removal apparatus with a base and a movable platform supported by the base, and defining the vertical operating range as the movement of each movable platform above its respective base to a maximum raised position relative to its respective base.

\* \* \* \* \*